Patented July 17, 1951

2,561,193

UNITED STATES PATENT OFFICE 2,561,193

α-METHYL BENZYL ESTERS OF CAMPHOLIC AND FENCHOLIC ACIDS

William A. Fry, Midland, Mich., assignor to The Dow Chemical Company, Midland, Mich., a corporation of Delaware No Drawing. Application May 20, 1949, Serial No. 94,520

3 Claims. (Cl. 260—468)

This invention relates to new isomeric α-methyl benzyl esters of campholic acid (I) and fencholic acid (II) having the respective formulas

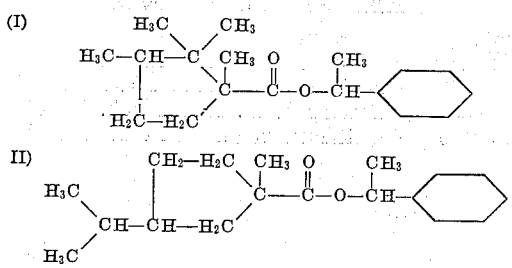

The invention also relates to new compositions of matter comprising said isomeric esters as stabilizing plasticizers in polymeric vinylidene chloride products.

The polymer of vinylidene chloride and many of its copolymers have been described in patents and in other literature during recent years. Such polymeric bodies, and compositions containing them, are herein referred to as polymeric vinylidene chloride products. It has been found that such products tend to darken after prolonged exposure to elevated temperatures. This darkening is accompanied by a change in other physical properties of the polymeric product and is assumed to be an evidence of partial decomposition. Because of the many desirable properties of polymeric vinylidene chloride products, a means is sought to overcome or prevent the tendency for such products to decompose on heating. In common with other thermoplastics, it is necessary to plasticize polymeric vinylidene chloride products to reduce their viscosity at molding or extrusion temperatures, even though the plasticizer may not all be retained in the shaped article. Most plasticizers have little, if any, heat stabilizing effect on polymeric vinylidene chloride products.

It is, accordingly, among the objects of the present invention to provide a composition of matter comprising a polymeric vinylidene chloride product stabilized against the decompositional effects of heat. A related object is to provide a heat stabilizer in the form of a plasticizer for polymeric vinylidene chloride products. Another object is to provide certain new esters exhibiting the desired properties.

I have prepared α-methyl benzyl campholate and α-methyl benzyl fencholate and have now found that the stated objects may be attained through the incorporation in polymeric vinylidene chloride products of from about 1 to about 10 per cent by weight, of either of these isomeric esters. If the ester is being relied on both as a plasticizer and a stabilizer, it will usually be employed in amounts of 6 to 10 per cent. If, however, other plasticizers are used, and a stabilizing effect only is desired, amounts of 1 to 6 per cent of the new esters will be sufficient.

The isomeric esters named above were prepared by converting fencholic or campholic acid into the corresponding acid chloride with thionyl chloride. A mole of the acid chloride was added slowly to a solution of one mole of pyridine in ethylene dichloride at a temperature of about 5° C. To this mixture, a mole of α-methyl benzyl alcohol was slowly added at a temperature of about 17° to 18° C. The mixture was then heated at a temperature of about 40° C. for 2 hours. At the end of this period, the pyridine hydrochloride was extracted by washing the mixture with water. The ethylene dichloride was distilled off and the ester was purified by distillation under reduced pressure. The new esters have the following physical properties:

| Ester | Boiling Point at Hg Absolute | | | Specific Gravity at 25/25° C. | Refractive Index at 25° C. |
|---|---|---|---|---|---|
| | 38 mm. | 57 mm. | 124 mm. | | |
| | °C. | °C. | °C. | | |
| α-Methyl benzyl campholate | 202 | 215 | 240 | 0.9972 | 1.4990 |
| α-Methyl benzyl fencholate | 205 | 218 | 242 | 0.9795 | 1.4914 |

These compounds have been found useful in stabilizing and plasticizing polymeric vinylidene chloride products for fabrication into films, filaments, and other articles by hot extrusion or molding operations. They are especially useful by making possible the preparation of odorless thermostable plastic articles.

By way of example, a copolymer of about 85 per cent vinylidene chloride and about 15 per cent vinyl chloride was thoroughly mixed with each of the above-named isomeric esters. A given weight of each such milled product was heated at 180° C. and the elapsed time (in minutes) noted before a rapid evolution of hydrogen chloride gas was first observed. For convenience, this time value in minutes shall hereafter be referred to as the "T-value." The amount of decomposition of a polymeric vinylidene chloride product may be judged from its T-value. A high T-value indicates a thermally stable composition and a low one a thermally unstable composition. Each of the compositions reported in the table below, except the blank, contains about 8 per cent by weight of the particular ester.

Composition: Average T-value
- α-Methyl benzyl campholate plus copolymer _____ 11
- α-Methyl benzyl fencholate plus copolymer _____ 11
- Blank (unmodified copolymer) _____ 4

The invention is not limited to the use of the disclosed compounds in the particular copolymer of the example, but is applicable generally to all polymeric vinylidene chloride compositions which tend to darken and decompose when heated, prolonging in each case the useful life of the polymer under exposure to heat. No advantage has been found in using over 10 per cent of one of the new esters, as such amounts are not needed for stability and are not retained in the fabricated articles.

I claim:
1. The α-methyl benzyl ester of an acid selected from the group consisting of campholic and fencholic acids.
2. α-Methyl benzyl campholate, a liquid distilling at 202° C. under 38 millimeters pressure, having a specific gravity of 0.9972 at 25/25° C., a refractive index of 1.4990 at 25° C., and the formula

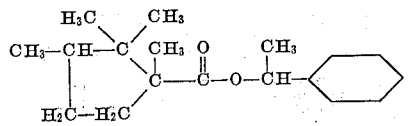

3. α-Methyl benzyl fencholate, a liquid distilling at 205° C. under 38 millimeters pressure, having a specific gravity of 0.9795 at 25/25° C., a refractive index of 1.4914 at 25° C., and the formula

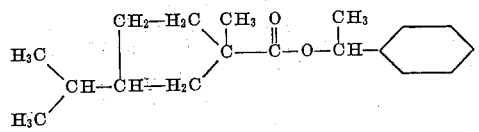

WILLIAM A. FRY.

REFERENCES CITED

The following references are of record in the file of this patent:

UNITED STATES PATENTS

| Number | Name | Date |
|---|---|---|
| 707,278 | Summers | Aug. 19, 1902 |
| 2,228,256 | Christiansen | Jan. 14, 1941 |
| 2,273,262 | Hanson et al. | Feb. 17, 1942 |
| 2,287,189 | Matheson et al. | June 23, 1942 |